United States Patent
Yamamoto et al.

(10) Patent No.: US 6,265,109 B1
(45) Date of Patent: Jul. 24, 2001

(54) MAGNESIUM ALLOY BATTERY

(75) Inventors: Osamu Yamamoto, Hirakata; Teruhisa Kanbara, Ikeda; Shuji Ito, Nara, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/323,892

(22) Filed: Jun. 2, 1999

(30) Foreign Application Priority Data

Jun. 2, 1998 (JP) .................................... 10-152464
Jun. 22, 1998 (JP) .................................... 10-174531
Oct. 21, 1998 (JP) .................................... 10-299397

(51) Int. Cl.[7] .................................................. H01M 4/46
(52) U.S. Cl. ..................................... 429/231.6; 429/218.1
(58) Field of Search ........................... 429/218.1, 218.2, 429/231.6, 231.95

(56) References Cited

U.S. PATENT DOCUMENTS

| 4,024,322 | * | 5/1977 | McKaveney | 429/201 |
|---|---|---|---|---|
| 5,122,375 | * | 6/1992 | Sklarchuck et al. | 429/229 |
| 5,554,456 | * | 9/1996 | Ovshinsky et al. | 429/59 |
| 5,928,483 | * | 7/1999 | Szpak et al. | 204/290 R |
| 6,040,087 | * | 3/2000 | Kawakami | 429/218.1 |

OTHER PUBLICATIONS

Linden, "Handbood of Batteries, second edition", McGraw–Hill, publishers, p. 9.2; no month available, 1995.*

* cited by examiner

*Primary Examiner*—Carol Chaney
(74) *Attorney, Agent, or Firm*—McDermott, Will & Emery

(57) ABSTRACT

A battery having a high capacity and a high negative electrode utilization rate is disclosed. It comprises a negative electrode active material including fine particles of magnesium or a magnesium alloy and, preferably, of such a magnesium alloy that contains at least one member selected from the group consisting of In, Ga, Sn, Pb, Cd, Mn, Co, Zn and Tl.

16 Claims, 1 Drawing Sheet

MAGNESIUM ALLOY BATTERY

BACKGROUND OF THE INVENTION

The present invention relates to a battery, especially to a non-aqueous electrolyte secondary battery. More especially, the present invention relates to an improvement in the negative electrode thereof.

The recent years, with the rapid development of portable or cordless electric appliances, demands are growing greater for such batteries having a high energy density that can drive these appliances for a long period of time.

For these demands, lithium ion secondary batteries, for instance, are attracting much attention. The lithium ion secondary batteries can obtain a high energy density by employing Li as the negative electrode thereof. However, Li is very expensive because the resources thereof are limited mainly to seawater and rock salt that contain only a scarce percentage of Li. Therefore, there is no promising possibility of reducing the price of the Li ion secondary batteries in future even by conducting a large-scale manufacturing.

For those reasons, an investigation directed to a secondary battery having a further high capacity is briskly conducted in recent years on a non-aqueous electrolyte battery employing a metal such as Mg or Al that produces polyvalent cations such as $Mg^{2+}$ or $Al^{3+}$ as a negative electrode active material. For instance, in a battery system employing $Mg^{2+}$, two electrons are transported by a reaction per one atom of Mg. Therefore, Mg battery has a higher energy density than the Li battery.

In addition, Mg is abundant in natural resources. For that reason, Mg takes up a very large expectation as a negative electrode material. The secondary battery system employing the metal that produces a polyvalent cation such as $Mg^{2+}$ is proposed in, for instance. Japanese Unexamined Patent Publications Sho 62-211861, Hei 1-95469, Hei 4-28172, respectively.

In the field of aqueous electrolyte secondary battery employing the polyvalent cation, lead-acid storage batteries, nickel-iron secondary batteries and nickel-zinc secondary batteries have conventionally developed as a low cost secondary battery. However, these aqueous electrolyte secondary batteries are difficult to raise the cell voltage because of the decomposition voltage of water. Further, in such nickel-iron secondary batteries and nickel-zinc secondary batteries, since decomposition of water in the electrolyte and a dry up of the aqueous electrolyte occur due to a high voltage during the charging stage, there is a need for supplementing water.

In the non-aqueous electrolyte secondary batteries which employ the polyvalent cation, an insulating layer may be formed on the surface of the negative electrode. Once the insulting layer is formed, the negative electrode becomes non-active and the overpotential becomes large. Therefore, the output current characteristic, the discharge capacity, voltage and cycle life characteristic of the battery are deteriorated. For these reason, utilization rate of the Mg negative electrode has been limited to as small as 10% to 20% of the theoretical capacity.

In addition, there are number of counter ions around the polyvalent cations such as $Mg^{2+}$ and they hinder the immigration of the polyvalent cations. The non-aqueous electrolyte itself which has an enough ionic conductivity is the key factor to realize the higher energy density batteries. The electrolyte solution for the Li ion secondary battery employs a mixed solvent of ethylene carbonate (EC), propylene carbonate (PC), γ-butyrolactam (γ-BL) or the like in which an electrolyte salt such as $LiPF_6$ or $LiBF_4$ are dissolved. Such electrolyte has a considerably high ionic conductivity in the case of monovalent ion of $Li^+$, but does not have a good conductivity in the case of the polyvalent cation such as $Mg^{2+}$.

BRIEF SUMMARY OF THE INVENTION

The object of the present invention is to solve the above-mentioned problems associated with the prior art. The present invention provides a high capacity battery which employs Mg for the negative electrode.

The present invention employs a negative electrode active material in a powder state having a large specific surface area, thereby improving the utilization rate of the Mg negative electrode.

The battery of the present invention comprises a negative electrode active material including fine particles of a magnesium alloy.

The fine particles are preferably small, and most suitably the average particle size of the fine particles is not larger the 70 μm.

The magnesium alloy contains at least one element selected from the group consisting of In, Ga, Sn, Pb, Cd, Mn, Co, Zn and Tl. In order to secure a satisfactory discharge capacity, it is desirable that the magnesium alloy contains magnesium at not less the 70 atomic %.

It is further effective for the improvement in the cycle characteristic if Ni or Cu is added to the surfaces of the active material fine particles. Such coating of Ni or Cu is also applicable to a magnesium metal fine particle. It is preferable that the amount of the added Ni or Cu is not more that 10 wt % of the fine particles. The Ni or Cu is added to the surfaces of the fine particles by means of, for instance, mixing, mechano-fusion process, or plating.

Incidentally, the non-aqueous battery employing the fine particles prepared by jet-milling (fluid energy milling) or mechanical pulverization in wet state as the negative electrode active material can not exhibit satisfactory performance. This is because the oxide or hydroxide firm coating which is an electrically insulation is formed on the surface in powdering step. Therefore, it is preferable to employ as a negative electrode active material a Mg alloy prepared by a process selected form the group consisting of gas-atomizing process, high-frequency melting process, ball-mill process, planetary ball-mill process and thermal diffusion process.

In another preferred mode of the present invention, the battery includes a non-aqueous electrolyte.

The preferred electrolyte contains a solvent including an acid amide and an electrolyte salt dissolved therein, thereby to ionically dissociate the salt into a polyvalent cation and an anion.

In a case of using a metal that produces the polyvalent cation for the negative electrode, it is effective to use such a solvent that has a large donor number or acceptor number. Further, in order to secure a high ionic conductivity, it is desirable to use a solvent having a high specific dielectric constant. The acid amides is suitable for this requirement. Although they have a slightly narrow potential window as compared with polypropylene carbonate (hereinafter referred to as "PC") or the like, they are almost within the range of the dissociation potential, for a metal other that Li.

Preferable acid amide is, for instance, N-methylformamide (hereinafter referred to as "NMF") or N,N-dimethylformamide (hereinafter referred to as "DMF"). In particle, NMF has a very high dielectric constant of about 186. In contrast, DMF has a feature that the specific dielectric constant becomes high when it dissolves an electrolytic salt therein. By employing an electrolyte further containing at least one other solvent selected form the group consisting of dimethyl acetoamide (hereinafter referred to as "DMAA"), acetonitrile (hereinafter referred to as "AN"), ethylene carbonate (hereinafter referred to as "EC"), propylene carbonate (hereinafter referred to as "PC") and γ-butyrolactam (hereinafter referred to as "γ-BL"), it is possible to widen the electric potential window and to increase the donor number and the acceptor number.

It is further preferable if the polyvalent cation contained in the electrolyte in $Mg^{2+}$. Further, the electrolyte salt is preferably a halogenide or a perchlorate of the polyvalent cation.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
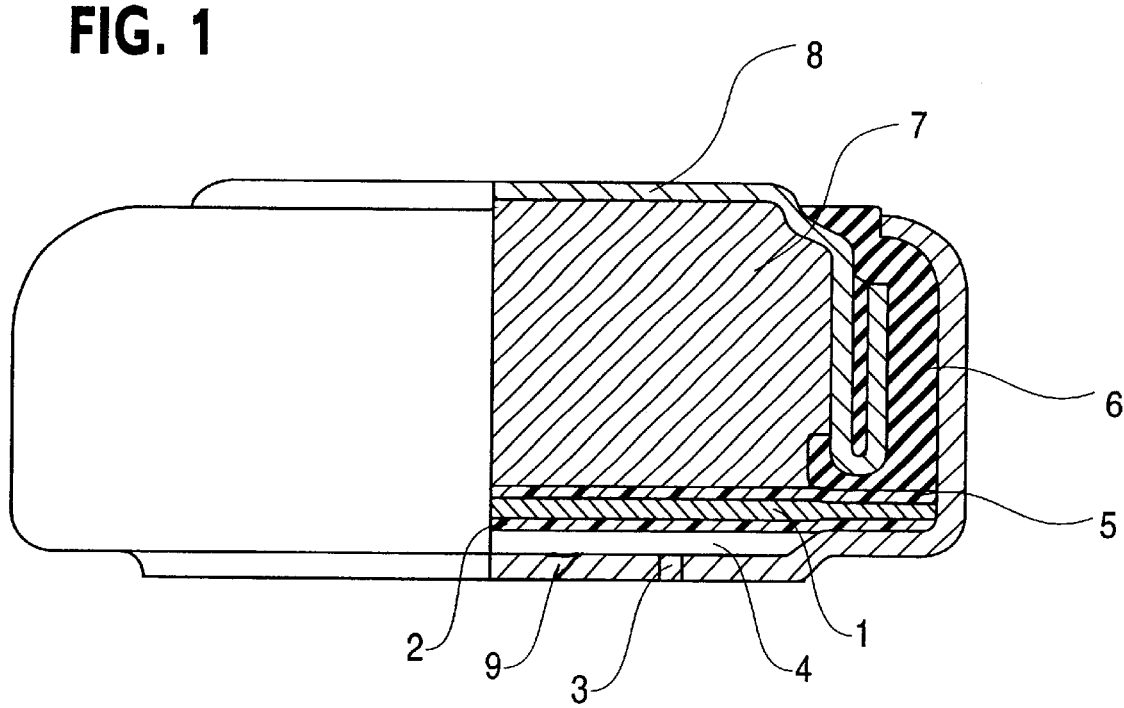
FIG. 1 is a longitudinal cross-sectional view showing a structure of the non-aqueous electrolyte secondary battery of an embodiment in accordance with the present invention.

In the following paragraphs, preferred embodiments of the present invention will be described in detail with reference to the attached drawing.

EXAMPLE 1

In the present example, utility of a powdered Mg negative electrode is investigated by using a battery which employs an aqueous electrolyte.

After melting Mg in a high frequency in-vacuo melting furnace, the molten metal was rapidly cooled and coagulated by gas atomizing process using argon gas, thereby to prepare Mg fine particles. The obtained Mg fine particles were generally spherical and had an average particle size of 70 µm.

Next, thus obtained Mg fine particles were mixed with DMAA and further combined with an electrolyte prepared by dissolving 0.1 mol of magnesium perchlorate ($Mg(ClO_4)_2$) in 1 mol of water to obtain a negative electrode paste. An air battery (primary cell) shown in FIG. 1 was assembled by using the obtained negative electrode paste. During the assembling process, all of the procedures were performed under an argon gas atmosphere. This is named as a battery of Example 1A.

As shown in FIG. 1, the negative electrode paste 7 is filled in a positive electrode container 9. An air intake port 3 for uptaking the outside air into the cell is provided on the bottom of the container 9. A diffusion paper 4 arranged on the inner bottom of the container 9 supports an air electrode 1 and permits the uptook air to diffuse. A water-repelling film 2 is made of polytetrafluoroethylene (hereinafter referred to as "PTFE"), which permits gases to path therethrough but shuts any liquid. A separator 5 arranged on the upper surface of the air electrode 1 and sandwiched between the air electrode 1 and the negative electrode paste 7 is impregnated with the electrolyte. The positive electrode container 9 is separated from a negative electrode container 8 with a gasket 6.

By classifying Mg fine particles produced in a similar manner by means of gas atomizing process, another Mg particles having an average particle size of 75 µm was obtained. By using the obtained Mg particles, another air battery was assembled in the similar manner. This is named as a battery of Example 1B.

In addition, a similar air battery was assembled by using Mg fine particles obtained by mechanically pulverizing cast Mg block and further pulverizing them in a wet condition to make the average particle size 70 µm. This is named as a battery of Example 1C.

Thus obtained air batteries were discharged at a discharge current of 1 mA per 1 g of Mg particles until the cell voltage dropped to 1.2 V. The average discharge voltages and the negative electrode utilization rates (actual capacity/theoretical capacity) therefor at the time are listed in Table 1.

TABLE 1

|  | Process | Particle Size | Positive Electrode | Average Discharge Voltage | Negative Electrode Utilization Rate |
| --- | --- | --- | --- | --- | --- |
| Example 1A | Gas-Atomizing | 70 µm | Air | 1.9 V | 90% |
| Example 1B | Gas-Atomizing | 75 µm |  | 1.8 V | 68% |
| Example 1C | Mechanical Pulverization | 75 µm |  | 1.6 V | 55% |

As clearly shown in Table 1, the batteries of this example show a higher negative electrode utilization rate. In particular, the batteries of Example 1A and Example 1B which employ the Mg fine particles prepared by means of gas atomizing process as their negative electrode active materials demonstrate a higher average discharge voltage and a higher negative electrode utilization rate as compared with the battery of Example 1C with the Mg particles prepared by mechanical pulverization. It is believed that the Mg fine particle obtained by the mechanical pulverization has on the surface thereof a tough and dense film of oxide, hydroxide or organic substance formed during the powdering process, which enlarges the polarization of the electrode.

Further, although the battery of Example 1B configured with the larger Mg particles has an almost equivalent average discharge voltage to that of the battery of Example 1A, the negative electrode utilization rate thereof is much inferior to the latter. It is believed that the resultant small specific surface area adversely affects the utilization rate characteristic. On the basis of this fact, it can be considered that a battery being excellent in discharge characteristic can be obtained by using Mg particles having an average particle size of not larger that 70 µm.

EXAMPLE 2

18 g of Mg (not larger than 100 mesh) and 2 g of Co (not larger that 100 mesh) were charged into a ball mill pot made of stainless steel having a capacity of 1 litter, and 50 pieces of stainless steel balls having a diameter of 19 mm and 60 pieces of stainless steel balls having a diameter of 12 mm were further charged into the pot. After substituting the atmosphere in the pot with argon, a mechanical alloying (hereinafter referred to as "MA") was performed, whereby the pot was rotated at 100 rpm for 10 days. By using the obtained alloy particles as the negative electrode active material, an air battery was assembled in a manner similar to that in Example 1.

The obtained air battery was discharged at a discharge current of 1 mA per 1 g of the Mg-Co alloy fine particles until the cell voltage dropped to 1.2 V. The average discharge voltage and the negative electrode utilization rate (actual capacity/theoretical capacity) at that time are listed in Table 2.

TABLE 2

| | Process | Particle Size | Positive Electrode | Average Discharge Voltage | Negative Electrode Utilization Rate |
|---|---|---|---|---|---|
| Example 2 | MA | 21 μm | Air | 22 V | 93% |

As clearly shown in Table 2, the battery of this example exhibits a higher average discharge voltage and negative electrode utilization rate as compared with the batteries of Example 1. It is believed that the conductivity of the oxide film formed on the surfaces of the Mg particles is secured by using the alloy, thereby to suppress the possible polarization.

EXAMPLE 3

Mg and Co in a ratio of 80 atomic %: 20 atomic % were charged into a high frequency in-vacuo melting furnace and molten. Then the molten metal was poured into a water-cooled casting die, thereby to coagulate the melt by rapid cooling. After coarsely crashing the obtained bulk of Mg-Co alloy in a jaw crasher mill, it was further pulverized by means of jet mill using argon gas. The average particle size of the obtained Mg-Co alloy particles was 38 μm.

Next, by adding to 100 parts by weight of this Mg-Co alloy particles, a small amount of DMAA containing $Mg(ClO_4)_2$ dissolved therein at 0.6 mol per 1 mol of the solvent, and 3 parts by weight of PTFE powder as a binding agent, a negative electrode paste was prepared. After painting the obtained negative electrode paste on a core material of perforated metal sheet made of Mo, the painted material was pressed and then heated under vacuum at 180° C. for 30 minutes to melt the PTFE. thereby to produce the negative electrode. By using a non-aqueous electrolyte consisting of DMAA and $Mg(ClO_4)_2$ dissolved therein at 0.5 mol per 1 mol of the solvent, and a positive electrode consisting of electrolytic manganese dioxide ($MnO_2$) whose capacity was sufficiently larger than the negative electrode, a negative electrode-regulated liquid-rich battery was assembled. This is named as a battery of Example 3.

As a comparative example, a bulk consisting only of Mg was prepared by means of casting process in a manner similar to that in the example, and by using Mg particles having an average particle size of 40 μm obtained by mechanically pulverizing the bulk, another battery was assembled in a similar manner. This is named as a battery of Comparative Example 3A.

In addition, for comparing the manufacturing processes, alloy bulks containing Mg and Co at the same ratio were prepared by using an arc-melting furnace, by electron beam melting process and by resistance heating process, respectively. Then the obtained bulks were pulverized into fine particles and employed as the negative electrode active materials of the batteries similar to that of the example. These are named as batteries of Comparative Examples 3B, 3C and 3D, respectively.

The obtained batteries were charged at a constant current of 2 mA per 1 g of Mg-Co alloy particles or Mg particles up to 120% of the theoretical capacity and discharged at the same constant current of 2 mA until the cell voltage dropped to 1.1 V.

The average discharge voltages and the negative electrode utilization rates (actual capacity/theoretical capacity), as well as the capacity maintenance rates (capacity at 50th cycle/initial capacity) of these batteries are listed in Table 3.

TABLE 3

| | Composition | Process | Particle Size | Average Discharge Voltage | Negative Electrode Utilization Rate | Capacity Maintenance Rate |
|---|---|---|---|---|---|---|
| Example 3 | $Mg_{0.8}Co_{0.2}$ | High frequency melting method | 38 μm | 1.9 V | 91% | 80% |
| Comparative Example 3A | Mg | High frequency melting method | 40 μm | 1.4 V | 22% | 68% |
| Comparative Example 3B | $Mg_{0.8}Co_{0.2}$ | Arc-melting | 35 μm | 1.5 V | 52% | 58% |
| Comparative Example 3C | | Electron beam | 36 μm | 1.6 V | 55% | 62% |
| Comparative Example 3D | | Resistance heating process | 38 μm | 1.6 V | 57% | 60% |

As clearly shown by Table 3, the battery of this example exhibits a higher average discharge voltage and a higher negative electrode utilization rate as compared with the battery of Comparative Example 3A configured by using the conventional Mg single substance, or the batteries of Comparative Examples 3B through 3D configured by using the Mg alloys prepared by the other processes. It is believed that the reason for the low negative electrode utilization rate of the battery of Comparative Example 3A is the formation of a tough and dense oxide film or such hydroxide film on the surfaces of the Mg particles, which invites a large overvoltage.

As the results of analyses on the Mg alloys prepared in Comparative Examples 3B through 3D in compliance with the arc melting process, the electron beam melting process and the resistance heating process, respectively, it was found that the Co was segregated from the other components in the solidified alloys because only Mg melts at the initial stage of the every processes. The inferior characteristics of the batteries of Comparative Examples 3B through 3D may strongly reflect the property of Mg single substance due to the segregation.

EXAMPLE 4

Mg (not larger than 100 mesh) and Mn (not larger than 100 mesh) were charged into a ball mill pot made of stainless steel having a capacity of 1 liter so as to make the whole weight 20 g at a ratio of 70 atomic %: 30 atomic %, then the mixture was subjected to a mechanical alloying by working the ball mill for 10 days. The obtained Mg—Mn alloy fine particles had an average particles size of 30 μm. By adding 3 part by weight of a PTFE powder as a binding agent and small amount of DMAA to 100 parts by weight of this Mg—Mn alloy particles, a paste was prepared. After painting the obtained paste on a core material of perforated metal sheet made of Mo, the painted material was pressed and then heated under vacuum at 180° C. for 30 minutes to melt the PTFE thereby to produce a negative electrode. By using an organic electrolyte of trimethylsulfoxide (TMSO) containing $Mg(ClO_4)_2$ dissolved therein at 1 mol per 1 mol of the solvent, and a positive electrode consisting of ferric sulfide ($FeS_2$) whose capacity was sufficiently large than that of the negative electrode, a negative electrode-regulated liquid-rich battery was assembled. This is named as a battery of Example 4.

For comparative purpose, batteries were assembled in a similar manner by using alloy bulks prepared by adding Fe, Al, Si, Cr, Cu or Ti at 30 atomic %, respectively, in place of Mn. These are named as batteries of Comparative examples 4A through 4F, respectively.

The obtained batteries were charged at a constant current of 2 mA per 1 g of Mg alloy particles up to 120% of the theoretical capacity and discharged at the same constant current of 2 mA/g until the cell voltage dropped to 1.1 V.

The average discharge voltages and the negative electrode utilization rates (actual capacity/theoretical capacity), as well as the capacity maintenance rates (capacity at 50th cycle/initial capacity) of these batteries are listed in Table 4.

TABLE 4

| | Composition | Particle Size | Average Discharge Voltage | Negative Electrode Utilization Rate | Capacity Maintenance Rate |
|---|---|---|---|---|---|
| Example 4 | $Mg_{0.8}Mn_{0.2}$ | 30 μm | 2.0 V | 92% | 78% |
| Comparative Example 4A | $Mg_{0.7}Fe_{0.3}$ | 37 μm | 1.4 V | 22% | 68% |
| Comparative Example 4B | $Mg_{0.7}Al_{0.3}$ | 36 μm | 1.5 V | 52% | 58% |
| COmparative Example 4C | $Mg_{0.7}Si_{0.3}$ | 39 μm | 1.6 V | 55% | 58% |
| Comparative Example 4D | $Mg_{0.7}Cr_{0.3}$ | 38 μm | 1.6 V | 57% | 58% |
| Comparative Example 4E | $Mg_{0.7}Cu_{0.3}$ | 38 μm | 1.5 V | 52% | 58% |
| Comparative Example 4F | $Mg_{0.7}Ti_{0.3}$ | 37 μm | 1.6 V | 55% | 58% |

As clearly shown in Table 4, the battery of this example exhibits a higher average discharge voltage, a higher negative electrode utilization rate and a higher capacity maintenance rate as compared with the batteries of Comparative Examples 4A through 4F.

In contrast, the batteries of Comparative Examples 4A through 4F configured by using the Mg alloys containing other element such as Fe are low in the average discharge voltage and negative electrode utilization rate in particular. Any improvement in their characteristics attributable to the alloying cannot by recognized. Further, if the content of Mn exceeds 30 atomic %, the discharge capacity itself is decreased remarkably. This tendency is similarly recognized in the other case of adding Co, In, Ga, Tl, Cd or Sn instead of Mn.

EXAMPLE 5

Mg (not larger than 100 mesh) and Cd (not larger than 100 mesh) were charged into a pot made of stainless steel having a capacity of 500 ml of a planetary ball mill so as to make the whole weight 10 g at a ratio of 90 atomic %; 10 atomic %, and 20 pieces of stainless steel balls having a diameter of 20 mm and 40 pieces of stainless steel balls having a diameter of 10 mm were further charged into the pot. After substituting the atmosphere inside the pot were argon, a mechanical alloying was performed by working the planetary ball mill with a rotation of 2000 rpm for 3 days. The obtained Mg—Cd alloy fine particles had an average particle size of 25 μm. By using this Mg—Cd alloy fine particles, a battery similar to that of Example 3 was assembled.

The obtained battery was charged at a constant current of 2 mA per 1 g of Mg alloy fine particles up to 120% of the theoretical capacity, and discharged at the same constant current of 2 mA/g until the cell voltage dropped to 1.1 V. Then results thereof are shown in Table 5.

TABLE 5

| | Composition | Particle Size | Average Discharge Voltage | Negative Electrode Utilization Rate | Capacity Maintenance Rate |
|---|---|---|---|---|---|
| Example 5 | $Mg_{0.9}Cd_{0.1}$ | 25 μm | 2.0 V | 91% | 79% |

As clearly shown in Table 5, the battery of this example is excellent in every points of the average discharge voltage, the negative electrode utilization rate and the capacity maintenance rate.

EXAMPLE 6

16 g of Mg (not large than 100 mesh) and 4 g of In (not larger than 100 mesh) were charged into a ball mill pot made of stainless steel having a capacity of 1 liter, and subjected to a mechanical alloying for 10 days. The obtained Mg—In alloy fine particles had an average particle size of 35 μm. By adding 3 parts by weight of PTFE as a binding agent and a small amount of DMAA to 100 parts by weight of the Mg—In alloy particles, a paste was prepared. After painting the obtained paste on a core material of perforated metal sheet made of Mo, the painted core material was pressed and then heated under vacuum at 180° C. for 30 minutes to melt the PTFE thereby to produce a negative electrode. By using organic electrolyte of TMSO containing $Mg(ClO_4)_2$ dissolved therein at 1 mol per 1 mol of the solvent, and a positive electrode consisting of $FeS_2$ whose capacity was sufficiently larger than that of the negative electrode, the negative electrode-regulated liquid-rich battery was assembled. This is named as a battery of Example 6A.

A similar battery was assembled by using another Mg—In alloy particles prepared in a similar manner with 14 g of Mg and 6 g of In. This is named as a battery of Example 6B.

Further, a similar battery was also assembled by using another Mg—In alloy particles prepared in a similar manner with 14 g of Mg and 7 g of In. This is named as a battery of Example 6C.

As a comparative example, a similar non-aqueous electrolyte battery was assembled in a similar manner by using a Mg—In alloy plate having an equivalent composition and weight to the Mg—In alloy particles used in the battery of Example 6A as the negative electrode. This is named as a battery of Comparative Example 6.

The obtained batteries were charged at a constant current of 5 mA per 1 g of Mg alloy particles up to 120% of the theoretical capacity and discharged at the same constant current of 2 mA/g until the cell voltage dropped to 1.1 V. The average discharge voltages and the negative electrode utilization rates, as well as the capacity maintenance rates (capacity at 50th cycle/initial capacity) of these batteries of this example and of Comparative example 6 are listed in Table 6.

TABLE 6

| | Process | Composition | Particle Size | Average Discharge Voltage | Negative Electrode Utilization Rate | Capacity Maintenance Rate |
|---|---|---|---|---|---|---|
| Example 6A | MA | $Mg_{0.95}In_{0.05}$ | 35 μm | 2.2 V | 94% | 82% |
| Example 6B | MA | $Mg_{0.92}In_{0.08}$ | 30 μm | 2.1 V | 86% | 88% |
| Example 6C | MA | $Mg_{0.9}In_{0.1}$ | 30 μm | 1.9 V | 72% | 89% |
| Comparative Example 6 | Plate | $Mg_{0.95}In_{0.05}$ | — | 1.8 V | 41% | 69% |

As clearly shown in Table 6, the batteries of this example show a higher average discharge voltage and a higher negative electrode utilization rate than the battery of the comparative example configured by using the alloy plate of the same composition as that of Example 6A. In addition, the high capacity can be maintained even after a repetition of charge/discharge cycles.

Among the batteries of this example, there is observed a tendency of lowering the negative electrode utilization rate, with the decrease in Mg content. However, the capacity maintenance rate is conversely improved.

EXAMPLE 7

8 g of Mg (not larger than 100 mesh) and 2 g of Pb (not larger than 100 mesh) were charged into a ball mill pot made of stainless steel having a capacity of 500 ml. and 20 pieces of stainless steel balls having a diameter of 20 mm and 40 pieces of stainless steel balls having a diameter of 10 mm were further charged into the pot. After substituting the atmosphere inside the pot with argon, a mechanical alloying was performed by working the planetary ball mill at a rotation of 2,000 rpm for 2 days. The obtained Mg—Pb alloy fine particles had an average particle size of 35 μm. A paste was prepared by adding 3 parts by weight of PTFE as a binding agent and a small amount of dimethylsulfoxide (hereinafter referred to as "DMSO") to 100 parts by weight of the Mg—Pb alloy particles. After painting the obtained paste on a core material of perforated metal sheet made of Mo, the painted material was pressed and then heated under vacuum at 180° C. for 30 minutes to melt the PTFE, thereby to produce a negative electrode.

A negative electrode-regulated liquid-rich battery was assembled by using thus obtained negative electrode, an organic electrolyte prepared by dissolving 0.6 mol of magnesium perchlorate in 1 mol of DMSO, and positive electrode of $Mo_6S_8$ whose capacity was sufficiently larger than that of the negative electrode.

As a comparative example, a similar secondary battery was produced by using a plate having the same composition as the above-mentioned Mg—Pb alloy particles as a negative electrode. This is named as a battery of Comparative Example 7.

The obtained batteries were charged and discharged in a manner similar to those of Example 6, thereby to examine their characteristics. The results thereof are shown in Table 7.

TABLE 7

| | Composition | Particle Size | Positive Electrode | Average Discharge Voltage | Negative Electrode Utilization Rate | Capacity Maintenance Rate |
|---|---|---|---|---|---|---|
| Example 7 | $Mg_{0.95}Zn_{0.05}$ | 30 μm | $Mo_6S_8$ | 2.0 V | 94% | 80% |
| Comparative Example 7 | | — | | 1.6 V | 31% | 64% |

As clearly shown in Table 7, the battery of this example demonstrates more excellent characteristics than those of Comparative example which uses the negative electrode of a plate material.

EXAMPLE 8

Mg alloys, each containing 15 wt % of Zn, Sn, Cd, Mn or Ga, were prepared in a manner similar to that in Example 3. Using the obtained Mg alloy particles for the negative electrodes, batteries similar to that of Example 4 were assembled. These are named as batteries of Examples 8A through 8E, respectively.

For comparative purpose, batteries were assembled by using an Mg alloy plate having the same composition as the negative electrodes, respectively. These are named as batteries of Comparative Examples 8A through 8E, respectively.

The obtained batteries were evaluated in a manner similar to those of Example 4. The results thereof are listed in Table 8.

TABLE 8

| | Composition | Particle Size | Average Discharge Voltage | Negative Electrode Utilization Rate | Capacity Maintenance Rate |
|---|---|---|---|---|---|
| Example 8A | $Mg_{0.94}Zn_{0.06}$ | 28 μm | 2.0 V | 91% | 80% |
| Comparative Example 8A | | Plate | 1.6 V | 32% | 66% |
| Example 8B | $Mg_{0.97}Sn_{0.03}$ | 26 μm | 2.1 V | 92% | 81% |
| Comparative Example 8B | | Plate | 1.7 V | 33% | 60% |
| Example 8C | $Mg_{0.96}Cd_{0.04}$ | 27 μm | 2.0 V | 93% | 81% |
| Comparative Example 8C | | Plate | 1.6 V | 40% | 65% |
| Example 8D | $Mg_{0.93}Mn_{0.07}$ | 33 μm | 1.9 V | 90% | 78% |
| Comparative Example 8D | | Plate | 1.5 V | 30% | 58% |
| Example 8E | $Mg_{0.94}Ga_{0.06}$ | 28 μm | 2.0 V | 91% | 80% |
| Comparative Example 8E | | Plate | 1.6 V | 32% | 66% |

As clearly shown in Table 8, the batteries of this example is excellent in the discharge voltage, negative electrode utilization rate and capacity maintenance rate as compared with the batteries of the comparative examples configured by employing the Mg alloy plate materials having the same compositions as the negative electrodes.

EXAMPLES 9 AND 10

After producing bulk of Mg—Tl alloy (containing Tl at 5 atomic %) by means of high frequency melting process similar to that in Example 3, the obtained bulk was mechanically pulverized to Mg—Tl alloy fine particles having an average particle size of 32 µm.

A battery similar to that of Example 3 was assembled by using the Mg—Tl alloy fine particles. This was named as a battery of Example 9.

Separate from this, 15 g of the obtained Mg—Tl alloy particles were subjected to a mechanofusion treatment with 1.3 g (equivalent to 8 wt %) of Ni fine particles having an average particle size of 30 nm under an argon atmosphere for 15 minutes, by using a mechanofusion unit (AM-15F available from Hosokawamicron Corporation) set a gap of 1 mm and rotation at 1200 rpm. By this treatment, the Ni fine particles were adhered to the surfaces of the Mg—Tl alloy particles uniformly.

Using the Mg—Tl alloy particles on which Ni particles were attached, another battery similar to that of Example 3 was assembled. This is named as a battery of Example 10.

The obtained batteries were charged at a constant current of 2 mA for 1 g of Mg alloy particles up to 120% of the theoretical capacity and discharged at the same constant current of 2 mA/g until the cell voltage dropped to 1.1 V. The result is listed in Table 9.

TABLE 9

| | Composition | Particle Size | Average Discharge Voltage | Negative Electrode Utilization Rate | Capacity Maintenance Rate |
|---|---|---|---|---|---|
| Example 9 | $Mg_{0.95}Tl_{0.05}$ | 32 µm | 1.9 V | 90% | 81% |
| Example 10 | $Mg_{0.95}Tl_{0.05}$ +8 wt % Ni | | 1.8 V | 86% | 86% |

As clearly shown in Table 9, a battery having excellent characteristics can be obtained by using the Mg—Tl alloy particles as the negative electrode. In addition, an adhesion of Ni onto the surfaces of the alloy particles improves the cycle life characteristics (capacity maintenance rate) of the battery.

EXAMPLE 11

In a manner similar to that in Example 6, Mg—In alloy particles having an average particle size of 35 µm were produced from 16 g of Mg and 4 g of In by using a ball mill.

Next, in compliance with the mechanofusion treatment similar to that in Example 10, 1.3 g of Ni fine particles having a particle size of 30 nm were caused to uniformly adhere to the surfaces of 15 g of the obtained Mg—In alloy particles.

Then, a paste was prepared by mixing 100 parts by weight of the Ni-adhered Mg—In alloy particles and 3 parts by weight of PTFE powder as a binder, with a small amount of dimethylformamide (hereinafter, referred to as DMF). After painting the obtained paste on a core material of perforated metal sheet made of Mo, the painted material was pressed and then heated under vacuum at 180° C. for 30 minutes to melt the PTFE, thereby to produce a negative electrode. Using an organic electrolyte of a mixed solution of DMF and DMSO containing them at a volumetric ratio of 1:1, in which $Mg(ClO_4)_2$ were dissolved at 1.5 mol per 1 mol in total of the mixture solvent, and a positive electrode consisting of $V_2O_5$ whose capacity was sufficiently larger than that of the negative electrode, a battery similar to that of Example 6 was assembled.

The obtained battery was charged and discharged in a similar manner to that of Example 6, thereby to examine the characteristics thereof. The results thereof are shown in Table 10 together with those of Example 6A.

TABLE 10

| | Composition | Coating | Particle Size | Positive Electrode | Average Discharge Voltage | Negative Electrode Utilization Rate | Capacity Maintenance Rate |
|---|---|---|---|---|---|---|---|
| Example 11 | $Mg_{0.95}In_{0.05}$ | 8.7 wt % Ni | 35 µm | $V_2O_5$ | 2.2 V | 90% | 88% |
| Example 6A | — | | | $FeS_2$ | 2.2 V | 94% | 82% |

As clearly shown in Table 10, the battery configured with the negative electrode of this example exhibits a further excellent cycle life characteristic as compared with the battery of Example 6 which has not been subjected to the surface treatment with Ni.

EXAMPLE 12

By mixing 16 g of Mg. 2 g of In and 2 of Ni (not larger than 100 mesh) in a ball mill similar to that used in Example 2, Mg—In—Ni alloy fine particles having an average particle size of 20 µm were produced.

Based on the result of analysis on the composition of thus obtained alloy particles by means of electron beam microanalysis (EPMA), it was confirmed that the composition corresponded to the mixing ratio and was almost homogeneous.

Subsequently, by adding 5 parts by weight of polyethylene (hereinafter, referred to as "PE") powder as a binding agent and a small amount of DMF to 100 parts by weight of these composite particles, a paste was prepared. After painting the obtained paste on a core material of perforated metal made of Ti, the painted material was pressed and then heated under vacuum at 130° C. for 30 minutes, thereby to melt the PE and to produce a negative electrode.

Using an organic electrolyte of a mixed solution containing DMAA and DMSO at a volumetric ratio of 2:1 in which $Mg(ClO_4)_2$ was dissolved at 1 mol per 1 mol of the mixture solvent, and a positive electrode consisting of $V_8O_{13}$ whose capacity was sufficiently larger than that of the negative electrode, a battery was assembled.

Next, the obtained battery was charged at a constant current of 5 mA per 1 g of the alloy particles up to 120% of the theoretical capacity and discharged at the same rate until the cell voltage dropped to 1.2 V. The average discharge voltages, the negative electrode utilization rates and the capacity maintenance rate (capacity at 50th cycle/initial capacity) of the batteries of this example and of Example 6 are listed in Table 11.

TABLE 11

|  | Composition | Particle Size | Electrolyte | Positive Electrode | Average Discharge Voltage | Negative Electrode Utilization Rate | Capacity Maintenance Rate |
|---|---|---|---|---|---|---|---|
| Example 12 | $Mg_{0.93}In_{0.02}Ni_{0.06}$ | 30 μm | DMAA + DMSO + $Mg(ClO_1)_2$ | $FeS_2$ | 2.1 V | 90% | 86% |
| Example 6A | $Mg_{0.956}In_{0.05}$ | 35 μm | TMSO + $Mg(ClO_4)_2$ | $V_8O_{13}$ | 2.2 V | 94% | 82% |

As clearly shown in Table 11, the battery of this example, configured by using Mg—In—Ni alloy particles as a negative electrode, maintains a higher capacity even after the repetition of the charge/discharge cycles than the battery of Example 6 configured by using Mg—In alloy particles.

If the Ni content of this alloy exceeds 10% however, although the battery demonstrates an excellent cycle life characteristic, the energy density thereof is greatly deteriorated.

EXAMPLE 13

After melting Mg in a high frequency in-vacuo melting furnace in a manner similar to that in Example 1, the molten metal was rapidly cooled to coagulate by means of argon gas atomizing process, thereby to produce Mg fine particles having an average particle size of 30 μm.

Next, 10 g of the obtained Mg fine particles were added to 200 ml of a saturated aqueous solution of nickel nitrate, and mixed by stirring at room temperature for 2 minutes. After recovering the Mg fine particles from the solution by the use of a filter paper, they were washed with water and dried under vacuum to obtain a negative electrode active material. As a result of analysis on the active material by EPMA, an existence of Ni on the surfaces of the particles was confirmed. This coating of Ni may be substitution plating of Mg with Ni. The amount of the plated Ni is considered to be about 5 wt %.

By adding 5 parts by weight of PE powder as a binding agent and a small amount of DMAA to 100 parts by weight of the Mg composite particles, a paste was obtained. The obtained paste was painted on a core material of perforated metal sheet made of Cu and pressed. Next, by heating the painted material under vacuum at 130° C. for 30 minutes, the PE was molten, thereby to produce a negative electrode. By employing an organic electrolyte prepared by dissolving 0.8 mol of magnesium bromide ($MgBr_2$) in 1 mol of DMAA and a positive electrode consisting of $V_8O_{13}$ whose capacity is sufficiently larger than that of the negative electrode, a battery was assembled.

A charge/discharge test similar to that in Example 6 was conducted on the obtained battery. The results thereof are shown in Table 12.

TABLE 12

|  | Composition | Coating | Particle Size | Electrolyte | Average Discharge Voltage | Negative Electrode Utilization Rate | Capacity Maintenance Rate |
|---|---|---|---|---|---|---|---|
| Example 13 | Mg | Ni-plating | 60 μm | DMAA + $MgBr_2$ | 1.8 V | 86% | 78% |

As clearly shown in Table 12, the battery of this example, configured by using Mg particles whose surfaces are Ni-plated is superior in the cycle life characteristic to the battery configured by using the Mg particles without being subjected to any treatment.

EXAMPLE 14

10 g of Mg (not larger than 100 mesh) and 6 g of Zn (not larger than 100 mesh) were charged into a ball mill pot made of stainless steel having a capacity of 1 liter, and 50 pieces of stainless steel balls having a diameter of 19 mm and 60 pieces of stainless steel balls having a diameter of 12 mm were further charged into the pot. After substituting the atmosphere in the pot with argon, a mechanical alloying was performed on the content of the pot, whereby the pot was rotated at 100 rpm for 12 days. The obtained Mg—Zn alloy particles had an average particle size of 8 μm. After mixing 5 parts by weight of PE powder with 100 parts by weight of these alloy particles, the mixture was painted on a current collector of a mesh made of Ti. This painted mesh was pressed and heated under vacuum at 130° C. for 30 minutes. Thereafter, by cutting this mesh into a square of 1 cm×1 cm, a negative electrode which carried 0.35 g of the active material was obtained.

Separate from this, by using a mixture containing 100 parts by weight of silver oxide (AgO), 5 parts by weight of PE and 5 parts by weight of ketchen black, and a mesh made of aluminum, a square positive electrode of 1 cm×1 cm, which carried 0.45 g of the active material, was obtained in a manner similar to the case of the negative electrode.

On both the surfaces of the obtained negative electrode, separators made from porous PTFE were arranged and on both the surfaces of the separators, the positive electrodes were further arranged. The combined body was sandwiched between a pair of glass plates, which was then fixed by squeezing with a clip.

1.0 mol of Mg $(ClO_4)_2$ and 1.0 mol of NMF were mixed and dehydrated by a molecular sieve down to a water content of not more than 100 ppm to obtain a non-aqueous electrolyte. By supplying the obtained electrolyte to the separators, a non-aqueous electrolyte secondary battery of the positive electrode regulated type was produced.

As an initial charge/discharge, after forcefully discharging the obtained battery at a current of 5 mA for 75 hours, it was charged at a current of 10 mA for 38 hours.

Thereafter, a charge/discharge cycle comprising a constant current discharging at 5 mA down to a cut-off voltage of 1.0 V and a constant current charging at 10 mA for 38 hours was repeated. The discharge capacity of about 410 mAh/g demonstrated at first cycle remains to be a still high value of 401 mAh/g even at 20th cycle.

EXAMPLE 15

After charging 10 g of Mg (not larger than 100 mesh) and 4 g of Sn (not larger than 100 mesh) into a ball mill pot made of stainless steel having a capacity of 1 liter, in a manner similar to that of Example 14, a mechanical alloying was performed, whereby the pot was rotated at 100 rpm for 12 days. The obtained Mg—Sn alloy particles had an average particle size of about 5 μm. A non-aqueous electrolyte secondary battery of the positive electrode regulated-type was produced in a manner similar to that of Example 14. As an electrolyte, on prepared by dissolving 1.0 mol of $Mg(ClO_4)_2$ and 0.5 mol of magnesium chloride ($MgCl_2$) in 1 mol of DMF was used and the charge/discharge was performed under the conditions similar to those in Example 14.

The discharge capacity of the battery of this example, which had been 388 mAh/g at the first cycle, demonstrated a still high value of 362 mAh/g even at 20th cycle. This advantage may be obtained by employing DMF which has a larger polarization (overpotential) as compared with NMF and the battery reached a cut voltage earlier. However, since the obtained value is almost approximate to the theoretical capacity, the electrode reaction of Mg may be performed almost completely.

EXAMPLE 16

In this example, batteries similar to that of Example 14 were assembled, respectively, by using various electrolytes listed in Table 13 and their discharge characteristics were examined.

In addition, for a comparative purpose, batteries were similarly assembled by using the electrolytes listed also in Table 13 whose main components were an organic solvent other than acid amides, and evaluated in a similar manner. The results thereof are also summarized in Table 13.

TABLE 13

|  | Electrolyte | Discharge Capacity at $1^{st}$ cycle | Discharge Capacity at $20^{th}$ cycle |
|---|---|---|---|
| Example 16A | 60 wt % NMF + 40 wt % AN + 1 mol $Mg(ClO_4)_2$ + 0.5 mol $MgCl_2$ | 410 mAh/g | 401 mAh/g |
| Example 16B | 80 wt % NMF + 20 wt % DMAA + 1 mol $Mg(ClO_4)_2$ + 0.5 mol $MgCl_2$ | 380 mAh/g | 356 mAh/g |
| Example 16C | 90 wt % NMF + 10 wt % PC + 1 mol $Mg(ClO_4)_2$ + 0.5 mol $MgCl_2$ | 390 mAh/g | 372 mAh/g |
| Example 16D | 90 wt % NMF + 10 wt % EC + 1 mol $Mg(ClO_4)_2$ + 0.5 mol $MgCl_2$ | 398 mAh/g | 380 mAh/g |
| Example 16E | 90 wt % NMF + 10 wt % γBL + 1 mol $Mg(ClO_4)_2$ + 0.5 mol $MgCl_2$ | 391 mAh/g | 378 mAh/g |
| Example 16F | 90 wt % DMF + 10 wt % AN + 1 mol $Mg(ClO_4)_2$ + 0.5 mol $MgCl_2$ | 378 mAh/g | 350 mAh/g |
| Example 16E | 90 wt % FA + 10 wt % AN + 1 mol $Mg(ClO_4)_2$ + 0.5 mol $MgCl_2$ | 368 mAh/g | 345 mAh/g |
| Example 16E | 90 wt % NMF + 10 wt % EC + 1 mol $Mg(ClO_4)_2$ + 0.5 mol $MgCl_2$ | 371 mAh/g | 352 mAh/g |
| Comparative Example 16A | 1 mol PC + 1 mol $MgCl_2$ | 102 mAh/g | 11 mAh/g |
| Comparative Example 16B | 1 mol AN + 1 mol $MgCl_2$ | 140 mAh/g | 15 mAh/g |

TABLE 13-continued

|  | Electrolyte | Discharge Capacity at $1^{st}$ cycle | Discharge Capacity at $20^{th}$ cycle |
|---|---|---|---|
| Example 16B Comparative Example 16C | 60 wt % AN + 40 wt % EC + 1 mol $MgCl_2$ | 151 mAh/g | 18 mAh/g |

Since any of the batteries of comparative examples employ electrolytes which are low in ionic conductivity (1.2 mS/cm in Comparative Example 16A, 2.1 mS/cm in Comparative Example 16B and 3.2 mS/cm in Comparative Example 16C), their discharge capacities are small and they can hardly discharge after the second cycle. Further, since these electrolytes have large polarization and the average discharge voltages are low, they immediately reach the cut voltage, thereby to make their discharge capacities small.

EXAMPLE 17

In a manner similar to that of Example 2, Mg—Co alloy particles having an average particle size of 6 μm and containing Co at 20 atomic % were produced by ball mill process. A battery similar to that of Example 14 was assembled by using a positive electrode containing 0.4 g of this alloy particles as a negative electrode active material and 0.5 g of electrolytic manganese dioxide ($MnO_2$). During the assembling procedure, the electrodes were sandwiched between a pair of glass plates while placing separators between the electrodes, and exerted a squeezing force by a clip, wherein the separators were impregnated with electrolytes prepared by dissolving each 0.5 mol of various electrolyte salts listed in Table 14 in a mixed solvent of formamide (FA) and dimethylacetoamide (DMAA) at a ratio of 6:4 by weight, thereby to assemble positive electrode regulated type batteries, respectively. The ionic conductivities of the respective electrolytes were all 14 mS/cm.

The discharge characteristics of the obtained batteries were examined. The results thereof are summarized in Table 14.

TABLE 14

|  | Electrolyte | Discharge Capacity at $1^{st}$ cycle | Discharge Capacity at $20^{th}$ cycle |
|---|---|---|---|
| Example 17A | 60 wt % FA + 40 wt % DMAA + 0.5 mol $Mg(ClO_4)_2$ | 150 mAh/g | 140 mAh/g |
| Example 17B | 60 wt % FA + 40 wt % DMAA + 0.5 mol $MgCl_2$ | 145 mAh/g | 119 mAh/g |
| Example 17C | 60 wt % FA + 40 wt % DMAA + 0.5 mol $MgBr_2$ | 135 mAh/g | 112 mAh/g |
| Comparative Example 17A | 60 wt % FA + 40 wt % DMAA + 0.5 mol $AlCl_3$ | 145 mAh/g | 119 mAh/g |
| Comparative | 60 wt % FA + 40 wt % DMAA + | 135 mAh/g | 112 mAh/g |

TABLE 14-continued

|  | Electrolyte | Discharge Capacity at $1^{st}$ cycle | Discharge Capacity at $20^{th}$ cycle |
|---|---|---|---|
| parative Example 17B | 0.5 mol NA(ClO$_4$)$_2$ | | |

As clearly shown in Table 14, the batteries configured by using the electrolyte containing a halogenide or a perchlorate salt which includes the same ion species as those of the negative electrodes are excellent in the aspect of the cycle life characteristics.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A battery comprising a negative electrode active material including fine particles of a magnesium alloy which produces $Mg^{2+}$ ion and two electrons per one Mg atom in a battery reaction,
   wherein said magnesium alloy comprises at least one member selected from the group consisting of In, Ga, Sn, Pb, Cd, Mn, Co, Zn, and Tl.

2. A battery comprising a negative electrode active material including fine particles of a magnesium alloy which produces $Mg^{2+}$ ion and two electrons per one Mg atom in a battery reaction,
   wherein said magnesium alloy contains magnesium at not less than 70 atomic %.

3. A battery comprising a negative electrode active material including fine particles of a magnesium alloy which produces $Mg^{2+}$ ion and two electrons per one Mg atom in a battery reaction,
   wherein Ni or Cu is added to the surfaces of said fine particles.

4. A battery comprising a negative electrode active material including fine particles of a magnesium alloy which produces $Mg^{2+}$ ion and two electrons per one Mg atom in a battery reaction,
   wherein said magnesium alloy is produced by means of one method selected from the group consisting of gas-atomizing process, high-frequency melting process, ball-mill process, planetary ball-mill process and thermal diffusion process.

5. The battery in accordance with claim 3, wherein the amount of said Ni or Cu is not more than 10 wt % of said fine particles.

6. The battery in accordance with claim 3, wherein said Ni or Cu is added to the surfaces of said fine particles by means of one method selected from the group consisting of mixing, mechano-fusion process and plating.

7. A battery comprising a negative electrode active material including fine particles of a magnesium alloy which produces $Mg^{2+}$ ion and two electrons per one Mg atom in a battery reaction,
   further comprising a non-aqueous electrolyte containing a solvent having an acid amide, and an electrolyte salt which dissolves in said solvent, thereby to ionically dissociate into a polyvalent cation and an anion.

8. The battery in accordance with claim 7, wherein said acid amide is N-methylformamide or N,N-dimethylformamide.

9. The battery in accordance with claim 7, wherein said non-aqueous electrolyte further comprises at least another solvent selected from the group consisting of dimethyl acetoamide, acetonitrile, ethylene carbonate, propylene carbonate and γ-butyrolactam.

10. The battery in accordance with claim 7, wherein said electrolyte salt is a halogenide or a perchlorate.

11. A battery comprising a negative electrode active material including fine particles of a magnesium alloy which produces $Mg^{2+}$ ion and two electrons per one Mg atom in a battery reaction, wherein Ni or Cu is added to the surface of said fine particles.

12. The battery in accordance with claim 11, wherein said magnesium alloy is produced by means of one method selected from the group consisting of gas-atomizing process.

13. The battery in accordance with claim 11, wherein the amount of said Ni or Cu is not more than 10 wt % of said fine particles.

14. The battery in accordance with claim 11, wherein said Ni or Cu is added to the surfaces of said fine particles by means of one method selected from the group consisting of mixing, mechano-fusion process, and plating.

15. The battery in accordance with claim 11, further comprising a non-aqueous electrolyte containing a solvent having an acid amide, and an electrolyte salt which dissolves in said solvent, thereby to ionically dissociate into a polyvalent cation and an anion.

16. A battery comprising a negative electrode active material including fine particles of a magnesium alloy which produces $Mg^{2+}$ ion and two electrons per one Mg atom in a battery reaction, and a non-aqueous electrolyte.

\* \* \* \* \*